(12) United States Patent
Hanounik

(10) Patent No.: US 7,215,768 B2
(45) Date of Patent: May 8, 2007

(54) SHARED NEW DATA AND SWAP SIGNAL FOR AN ENCRYPTION CORE

(75) Inventor: Bedros Hanounik, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 830 days.

(21) Appl. No.: 10/179,865

(22) Filed: Jun. 25, 2002

(65) Prior Publication Data

US 2003/0235301 A1 Dec. 25, 2003

(51) Int. Cl.
*H04L 9/06* (2006.01)
(52) U.S. Cl. .................................... 380/37
(58) Field of Classification Search .................. 380/37
See application file for complete search history.

(56) References Cited

U.S. PATENT DOCUMENTS

| 6,028,939 | A  | * | 2/2000 | Yin ........................... 713/189 |
| 6,578,150 | B2 | * | 6/2003 | Luyster ....................... 380/37 |
| 6,760,439 | B1 | * | 7/2004 | Windirsch ................... 380/37 |
| 2002/0051534 | A1 | * | 5/2002 | Matchett et al. ............. 380/37 |
| 2002/0106080 | A1 | * | 8/2002 | Qi et al. ..................... 380/37 |

* cited by examiner

*Primary Examiner*—Christopher Revak
*Assistant Examiner*—Saoussen Besrour
(74) *Attorney, Agent, or Firm*—Buckley, Maschoff & Talwalkar LLC

(57) ABSTRACT

According to some embodiments, a shared new data and swap input line adapted to receive a shared new data and swap bit and an output bit that is the shared new data and swap bit is provided.

17 Claims, 8 Drawing Sheets

330

| S-BOX 1 | | | | | | | | | | | | | | | |
|---|---|---|---|---|---|---|---|---|---|---|---|---|---|---|---|
| 14 | 4 | 13 | 1 | 2 | 15 | 11 | 8 | 3 | 10 | 6 | 12 | 5 | 9 | 0 | 7 |
| 0 | 15 | 7 | 4 | 14 | 2 | 13 | 1 | 10 | 6 | 12 | 11 | 9 | 5 | 3 | 8 |
| 4 | 1 | 14 | 8 | 3 | 6 | 2 | 11 | 15 | 12 | 9 | 7 | 3 | 10 | 5 | 0 |
| 15 | 12 | 8 | 2 | 4 | 9 | 1 | 7 | 5 | 11 | 3 | 4 | 10 | 0 | 6 | 13 |

332

SHARED NEW DATA AND SWAP SIGNAL FOR AN ENCRYPTION CORE

BACKGROUND

To protect and/or authenticate information, it is known that a sender can encrypt data. For example, the sender may encrypt an original message of "plaintext" to create "ciphertext," such as by encrypting the plaintext using an encryption key in accordance with the Data Encryption Standard (DES) defined by American National Standards Institute (ANSI) X3.92 "American National Standard for Data Encryption Algorithm (DEA)" (1981). The sender can then securely transmit the ciphertext to a recipient. The recipient decrypts the ciphertext to re-create the original plaintext (e.g., using a decryption key in accordance with DES).

To increase the security of an encryption process, multiple rounds of encryption may be performed. For example, FIG. 1 is an overview of a sixteen round DES encryption process 100. After an Initial Permutation (IP) is performed on an original 64-bit block of plaintext, the information is divided into a left potion ($L_0$) and a right portion ($R_0$), each being 32 bits long. In the first encryption round, $R_0$ is combined with an encryption key ($K_1$) via a function ($f$). The output of this function is then combined with $L_0$ via an exclusive OR (XOR) operation. Finally, the result of the XOR operation becomes the right portion for the next encryption round (i.e., $R_1$) and $R_0$ becomes the left portion (i.e., $L_1$). This "swapping" process is repeated in each of the first fifteen encryption rounds, thus:

$$R_i = L_{i-1} XOR f(R_{i-1}, K_1)$$

$$L_i = R_{i-1}$$

In last encryption round, the left and right portions are not swapped, thus:

$$R_i = R_{i-1} (\text{or } R_{16} = R_{15})$$

$$L_i = L_{i-1} XOR\ f(R_{i-1}, K_i) (\text{or } L_{16} = L_{15} XOR\ f(R_{15}, K_{16}))$$

FIG. 2 illustrates one round 200 of the DES encryption process in further detail (round i). In particular, the function $f$ includes an expansion permutation (EXP) 210 that generates a 48-bit value based on the 32-bit right portion ($R_{i-1}$). In addition, two 28-bit halves of the current 56-bit encryption key are circularly shifted 230 and combined via a compression permutation (COMP) 240 to generate a 48-bit subkey ($K_i$). The subkey is then combined with the result of the expansion permutation 210 via an XOR operation 220, and the result of the XOR operation 220 is provided to an S-box substitution unit 300.

As illustrated in FIG. 3, the S-box substitution unit 300 converts a 48-bit input 310 to a 32-bit output 320 via a number of S-boxes. In particular, each S-box translates a six-bit input ($b_1$ through $b_6$) into a four-bit output in accordance with a table of predefined values. FIG. 4 is a table 330 illustrating four rows and sixteen columns of S-box values 332 for the first S-box. Note that $b_1$ and $b_6$ represent the particular row and $b_2$ through $b_5$ represent that particular column that will be used to select the appropriate four-bit S-box output (i.e., "0" through "15").

Referring again to FIG. 2, the 32-bit output from the S-box unit 300 is scrambled via a P-box permutation unit 250 before being combined with the 32-bit left portion ($L_{i-1}$) via a second XOR operation 260. Referring again to FIG. 1, the process is repeated sixteen times (with the left and right portions not being swapped in the final round). A final permutation ($IP^{-1}$) is then performed to generate the ciphertext.

The encryption process is then repeated for the next 64-bit block of plaintext. A process similar to the one described with respect to FIGS. 1 through 4 may be performed to decrypt a ciphertext message (i.e., to re-create the original plaintext).

Thus, a device adapted to protect and/or authenticate information will sometimes need to swap—and sometimes need to not swap—the left and right portions during encryption rounds. Moreover, the device may need to load information associated with a new block of plaintext (or a new block of ciphertext during a decryption process). This type of device, however, may be inefficiently designed given the environment in which it is implemented. For example, a device may be designed for a Field-Programmable Gate Array (FPGA) environment. An FPGA is an integrated circuit that can be programmed after manufacture by connecting various Configurable Logic Blocks (CLBs), such as look-up tables, together in different ways. A design for a device adapted to protect and/or authenticate information might inefficiently use such CLBs, especially if different types of processes need to be supported (e.g., swapping or not swapping left and right portions, or loading a new block of plaintext or ciphertext).

DETAILED DESCRIPTION

Some of the described embodiments are associated with an "encryption process." As used herein, the phrase "encryption process" may refer to a process that encrypts or decrypts data. Examples of an encryption process include DES, triple-DES as defined by ANSI X9.52 "Triple Data Encryption Algorithm Modes of Operation" (1998), and Advanced Encryption Standard (AES) as defined by Federal Information Processing Standards (FIPS) publication 197 (2002). Details about these, and other, encryption processes can be found in Bruce Schneier, "Applied Cryptography" (2nd Ed., 1996).

Encryption Devices

Figure 5:
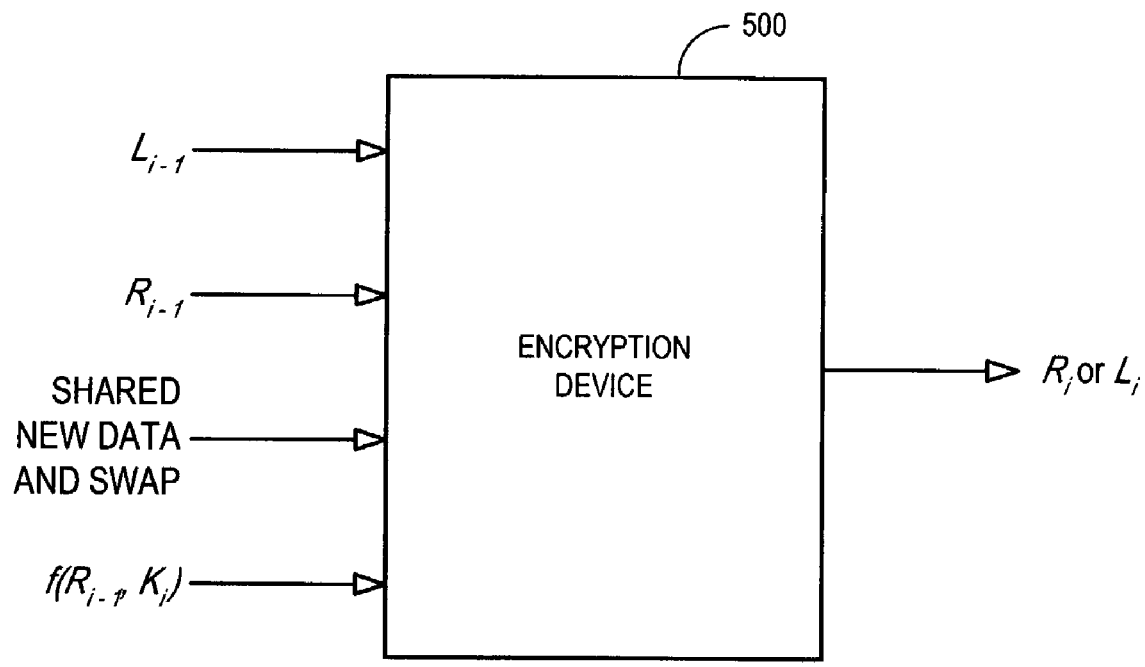
FIG. 5 is a block diagram of an encryption device according to some embodiments.

FIG. 5 is a block diagram of an encryption device 500 according to some embodiments. The encryption device 500 may be associated with, for example, an encryption engine adapted to encrypt plaintext and/or decrypt ciphertext.

The encryption device 500 has a left portion bit input line and a right portion bit input line adapted to receive a left portion signal and a right portion signal associated with a prior encryption round (e.g., a $L_{i-1}$ bit and a $R_{i-1}$ bit, respectively). The encryption device 500 further includes a function bit input line adapted to receive a function bit generated based on the right portion bit and a key bit, or $f(R_{i-1}, K_i)$. The function bit may comprise, for example, an output of an encryption S-box (e.g., after the information has been scrambled by a P-box).

The encryption device 500 also has an output line that may be associated with either a right portion register or a left portion register (i.e., associated with the current encryption round's $R_i$ or $L_i$). According to some embodiments, the output line may represent a "swapped" portion bit (e.g., during the first fifteen rounds of a DES encryption process). Note that this may require that the shared new data and swap bit be set to a pre-determined value. Consider, for example, an encryption device 500 having an output line associated with $L_i$. In this case, a swapped portion bit may represent $R_{i-1}$. In contrast, a swapped portion bit may represent $L_{i-1}$, XOR $f(R_{i-1}, K_i)$ when the output line is associated with $R_i$.

According to some embodiments, the output line may instead represent a "non-swapped" portion bit (e.g., during the last or sixteenth round of a DES encryption process). Note that this may require that the shared new data and swap bit is set to a pre-determined value. Consider again an encryption device 500 having an output line associated with $L_i$. In this case, a non-swapped portion bit may represent $L_{i-1}$, XOR $f(R_{i-1}, K_i)$. On the other hand, a non-swapped portion bit may represent $R_{i-1}$ when the output line is associated with $R_i$.

According to some embodiments, the output line may also represent the shared new data and swap bit (e.g., when a new left or right portion is being loaded by an encryption engine). In this case, the left portion bit, the right portion bit, and the function bit may need to be set to pre-determined values.

Figure 6:
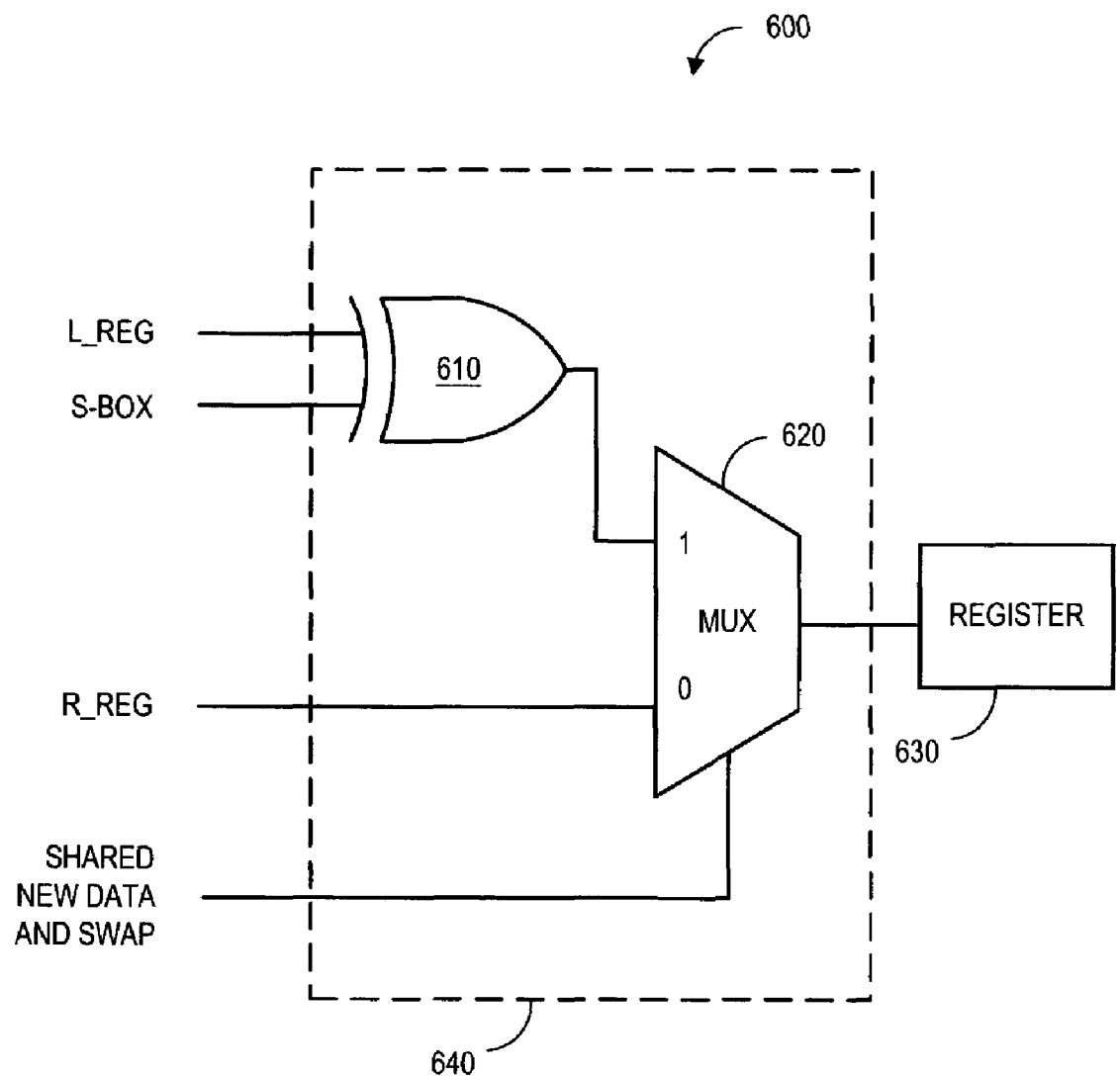
FIG. 6 is a more detailed diagram of an encryption device according to some embodiments.

FIG. 6 is a more detailed diagram of an encryption device 600 according to some embodiments. As can be seen, the encryption device 600 includes an XOR unit 610 that receives a left portion input line (i.e., "L_REG" adapted to receive a left key bit associated with a prior encryption round) and an output of an S-box (e.g., "S-BOX"—which may, in fact, represent information after it has been scrambled by a P-box).

The encryption device 600 further includes a multiplexer 620 that receives the output of the XOR unit 610 and a right portion input line (i.e., "R_REG" adapted to receive a right key bit associated with a prior encryption round). The multiplexer 620 is controlled by a shared new data and swap bit such that the multiplexer 620 outputs: (i) the information from the XOR unit 610 when the shared new data and swap bit is "1," and (ii) R_REG when the shared new data and swap bit is "0." Note that this embodiment is for illustration purposes only (e.g., the "1" and "0" values of the shared new data and swap bit could be reversed).

The encryption device 600 may be associated with, for example, an FPGA environment. Note that, in this embodiment, a single input line represent either a control signal (i.e., indicating whether or not information portions should be swapped) or an information signal (i.e., new information). As a result, the encryption device 600 only requires four input lines—and the appropriate logic function may be implemented with a single Look-Up Table (LUT) 640 in an FPGA environment (e.g., using a single FPGA slice for each bit of information being encrypted and/or decrypted). Using a single LUT 640 may reduce the area of the circuit and improve the performance of an encryption engine. An example of an FPGA environment that may be appropriate for such an implementation is available from XILINX®.

According to other embodiments, the encryption device 600 is instead implemented in an Application Specific Integrated Circuit (ASIC) environment.

The output of the multiplexer 620 is coupled to a portion register 630. The portion register 630 may comprise, for example, a digital flip-flop. Note that the portion register 630 might be associated with either a left portion bit or a right portion bit. The operation of the encryption device 600 will now be described in further detail with respect to FIGS. 7 and 8.

Encryption Methods

Figure 7:
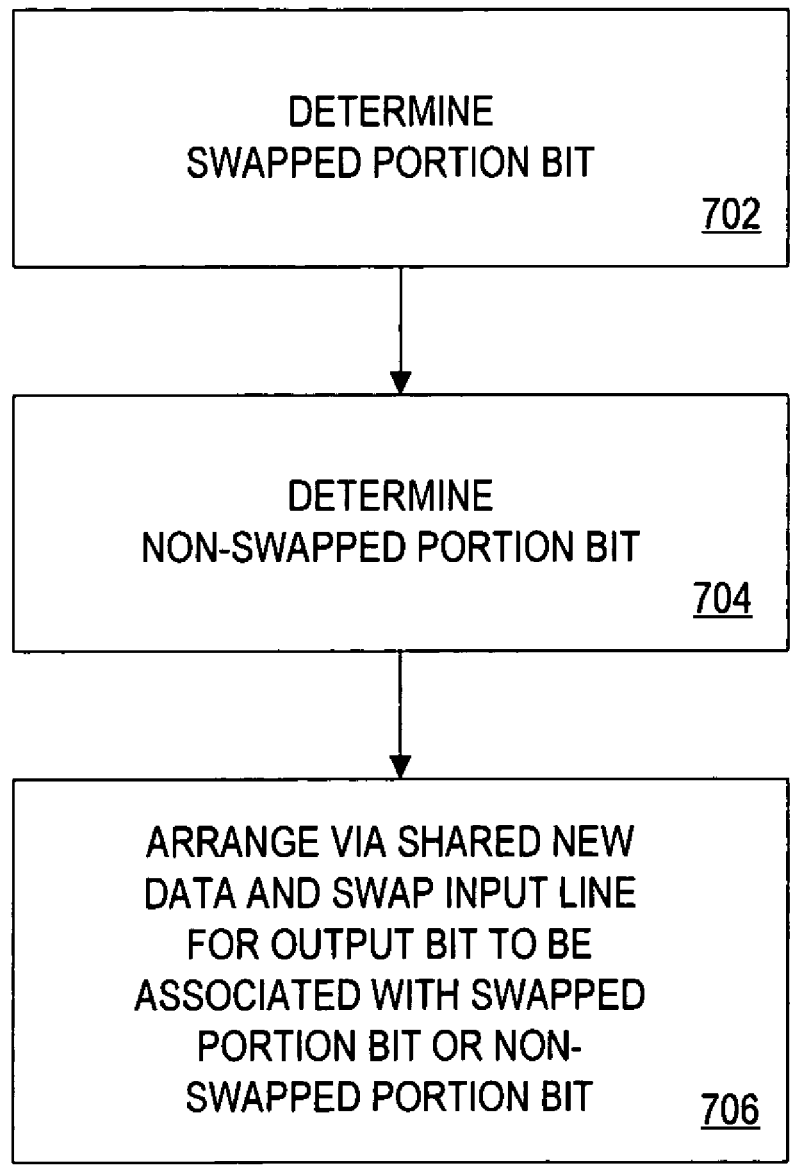
FIG. 7 is a flow chart of a method of facilitating an encryption process according to some embodiments.

FIG. 7 is a flow chart of a method of facilitating an encryption process according to some embodiments. The flow charts described herein do not imply a fixed order to the steps, and embodiments of the present invention may be practiced in any order that is practicable. The method may be performed, for example, using the encryption device 500 shown in FIG. 5 and/or the encryption device 600 shown in FIG. 6.

A swapped portion bit and a non-swapped portion bit are determined at 702 and 704, respectively. At 706, it is arranged via a shared new data and swap input line for an output bit to be associated with the swapped portion bit or the non-swapped portion bit.

Referring to FIG. 6, consider the case when the portion register 630 is associated with the left portion during one of the first fifteen rounds of a DES encryption process (i.e., when the left and right portions are to be swapped). In this situation, the shared new data and swap bit may be set to "0" causing the output bit equal R_REG (i.e., $R_{i-1}$). During the sixteenth round of the encryption process (i.e., when the left and right portions are not to be swapped), the shared new data and swap bit may be set to "1" causing the output bit to equal L_REG XOR S-BOX (i.e., $L_{i-1}$ XOR $f(R_{i-1}, K_i)$).

Now consider the case when the portion register 630 is associated with the right portion during one of the first fifteen rounds of a DES encryption process (i.e., when the left and right portions are to be swapped). In this situation, the shared new data and swap bit may be set to "1" causing the output bit equal L_REG XOR S-BOX (i.e., $L_{i-1}$ XOR $f(R_{i-1}, K_i)$). During the sixteenth round of the encryption process (i.e., when the left and right portions are not to be swapped), the shared new data and swap bit may be set to "0" causing the output bit equal R_REG (i.e. $R_{i-1}$).

Figure 8:
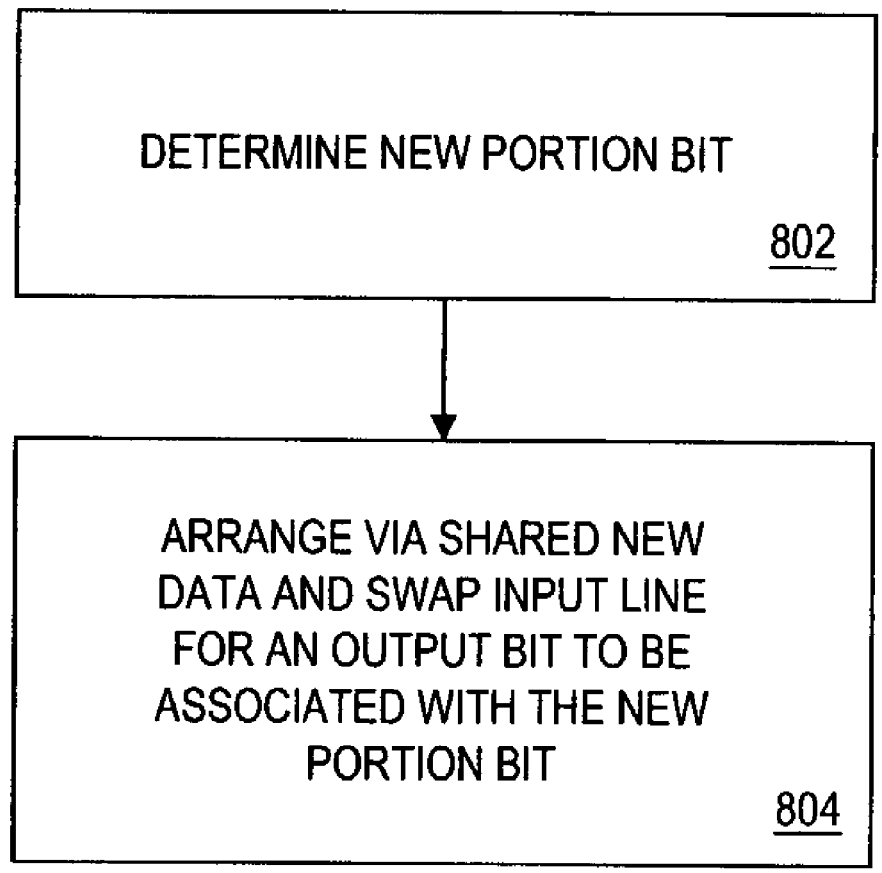
FIG. 8 is a flow chart of a method of facilitating an encryption process according to some embodiments.

FIG. 8 is a flow chart of a method of facilitating an encryption process according to some embodiments. The method may be performed, for example, using the encryption device 500 shown in FIG. 5 and/or the encryption device 600 shown in FIG. 6.

In this case, a new portion bit is determined at 802. A new portion bit may be determined, for example, when an encryption core has completed the encryption process for a previous block of plaintext or ciphertext.

At 804, it is arranged via a shared new data and swap input line for an output bit to be associated with the new portion bit by providing a pre-determined swapped portion bit, non-swapped portion bit, and function bit. For example, L_REG may be set to "1," S-BOX may be forced to "0," and R_REG may be set to "0." In this way, the output bit will equal "1" when the shared new data and swap bit equals "1" (i.e., because the output of the XOR unit 610, and thus the multiplexer 620, will equal "1"). Moreover, the output bit will equal "0" when the shared new data and swap bit equals "0." As a result, the register 630 will simply be loaded with the shared new data and swap bit (i.e., representing the new portion bit).

Figure 1:
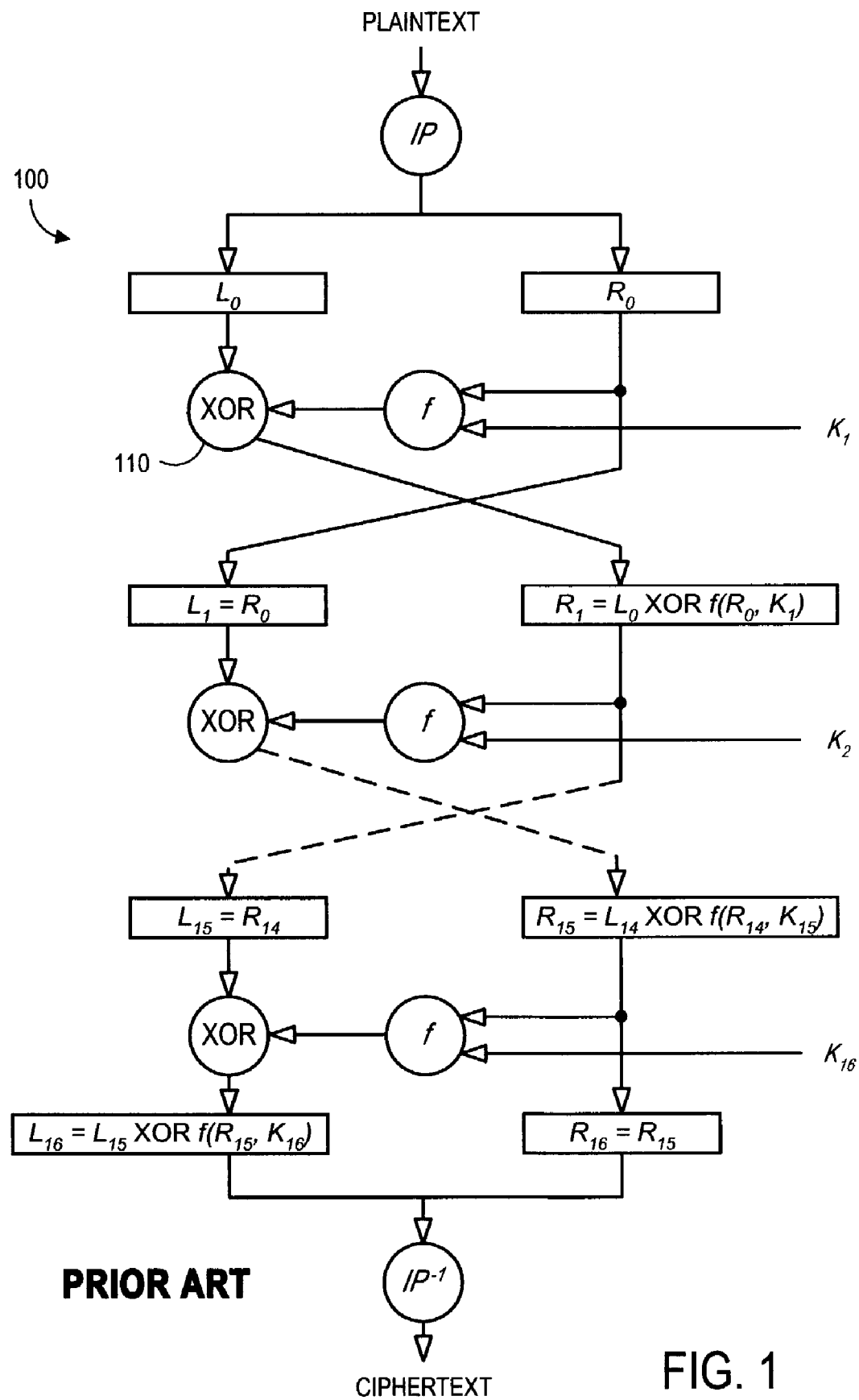
FIG. 1 is an overview of a sixteen round DES encryption process.
Figure 2:
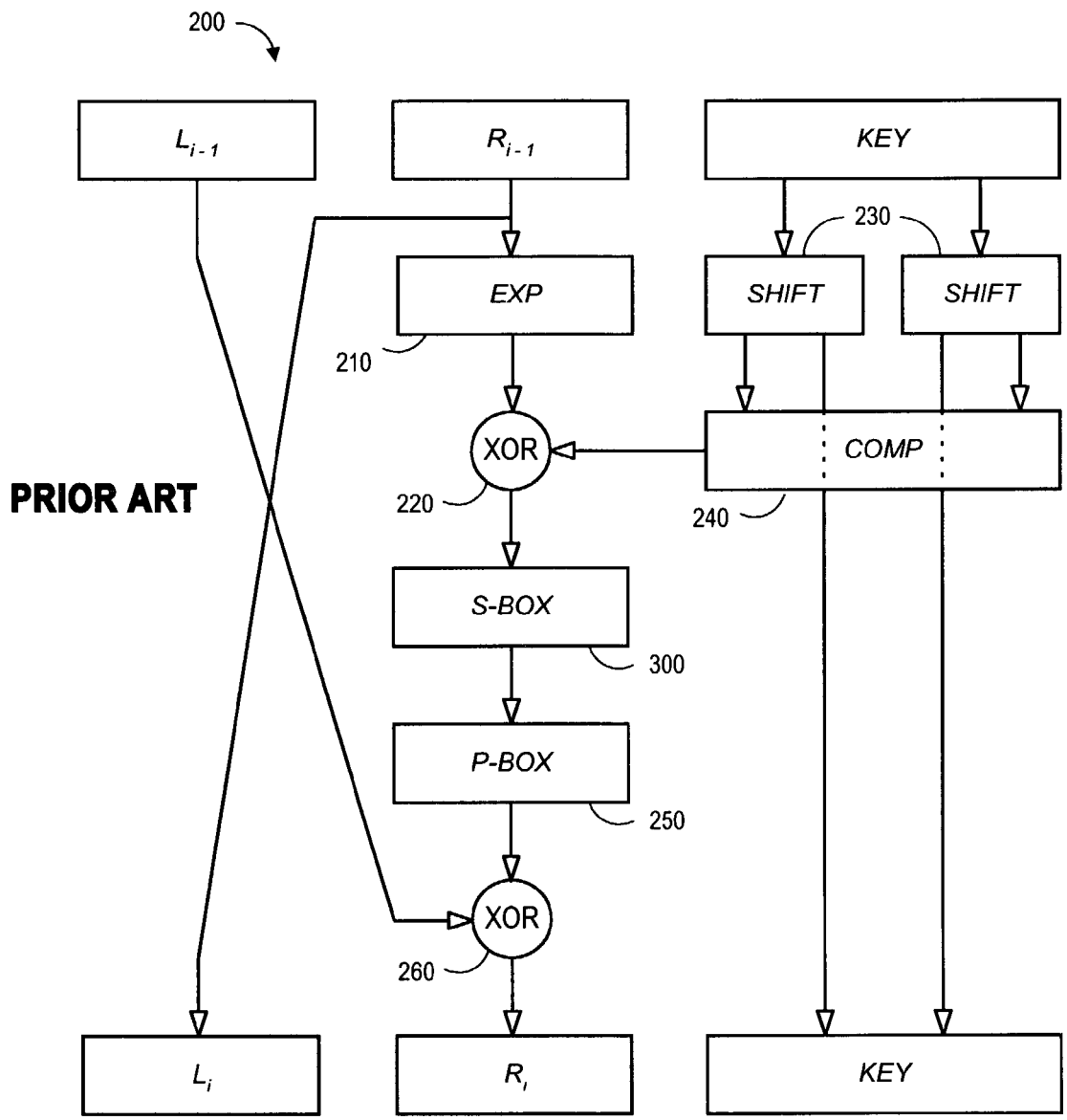
FIG. 2 illustrates one round of the DES encryption process in further detail.
Figure 3:
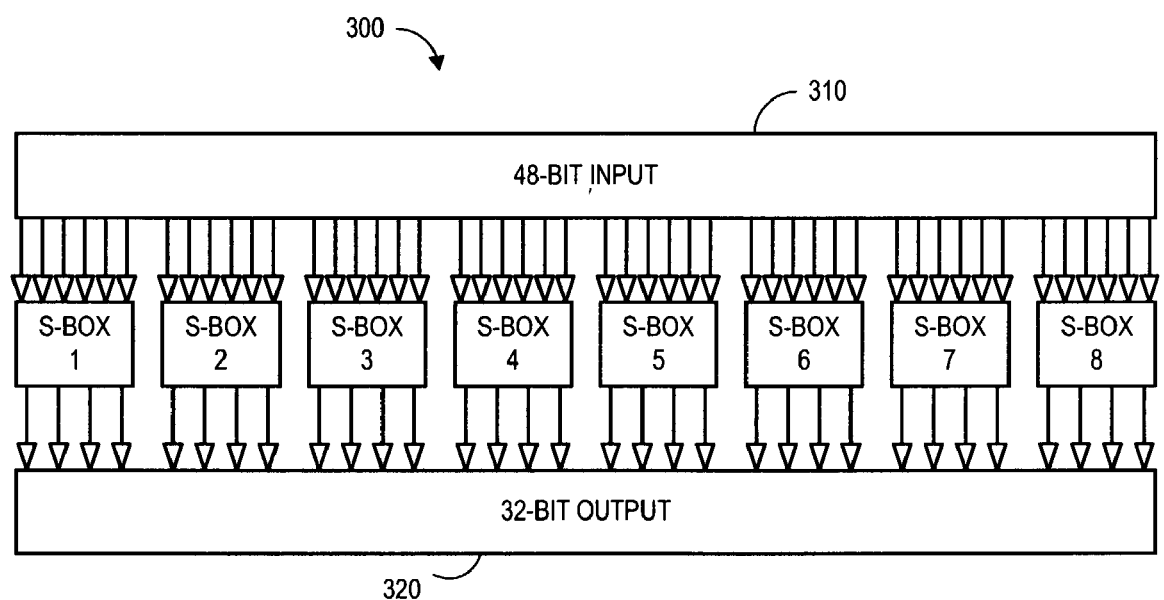
FIG. 3 illustrates the use of encryption S-boxes during the DES encryption process.
Figure 4:
FIG. 4 is a table illustrating S-box values for the DES encryption process.

Note that in order to force S-BOX to "0" as described above, the input to an S-box substitution unit ($b_1$ through $b_6$) may need to be set to a non-zero value. Consider again the table 330 illustrated in FIG. 4. In this case, $b_1$ and $b_6$ might be set to "00" (selecting the first row) and $b_2$ through $b_5$ might be set to "1110" (selecting the fifteen column) in order to force the output of the S-Box to "0." Note that other S-box inputs may be used instead (e.g., $b_1$ and $b_6$ could be set to "01" and $b_2$ through $b_5$ could be set to "0000") a that the scrambling effect of the P-box may need to be taken into account. The appropriate values to be provided to the S-box may be stored in a storage device (e.g., a memory unit not shown in FIG. 6).

Note that any number of similar arrangement may also be used. For example, L_REG may be set to "0" and S-BOX may be forced to "1" (which will still result in the XOR unit 610 outputting a "1"). This could be done, for example, by setting $b_1$ and $b_6$ to "11" and $b_2$ through $b_5$ to "0000" (i.e., causing the S-box to output "15" or "1111").

ADDITIONAL EMBODIMENTS

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although embodiments have been described with respect to a DES encryption process, other embodiments may be associated with other types of encryption processes. Moreover, although software or hardware are described as performing certain functions, such functions may be performed using software, hardware, or a combination of software and hardware (e.g., a medium may store instructions adapted to be executed by a processor to perform a method of facilitating an encryption process). For example, functions described herein may be implemented via a software simulation of FPGA hardware.

The several embodiments described herein are solely for the purpose of illustration. Persons skilled in the art will recognize from this description other embodiments may be practiced with modifications and alterations limited only by the claims.

What is claimed is:

1. An encryption device, comprising:
   a shared new data and swap input line adapted to receive a shared new data and swap bit;
   a left portion input line adapted to receive a left portion bit;
   a right portion input line adapted to receive a right portion bit;
   a function input line adapted to receive a function bit associated with an encryption function; and
   an output line adapted to provide an output bit to a left portion register based, at least in part, on the shared new data and swap bit, wherein the output bit represents
   a swapped portion bit, a non-swapped portion bit, and the shared new data and swap bit,
   wherein the swapped portion bit is the right portion bit, and the non-swapped portion bit is the left portion bit combined with the function bit via an exclusive OR operation, and
   wherein the output bit is the shared new data and swap bit when a new left or right portion is being loaded by an encryption engine.

2. The encryption device of claim 1, wherein the output bit is the shared new data and swap bit when the left portion bit, the right portion bit, and the function bit have pre-determined values.

3. The encryption device of claim 2, further comprising:
   a storage device storing information adapted to produce the pre-determined value for the function bit.

4. The encryption device of claim 1, further comprising:
   an exclusive OR unit adapted to receive the left portion bit and the function bit; and a multiplexer adapted to output one of an output bit of the exclusive OR unit and the right portion bit based on the shared new data and swap bit.

5. The encryption device of 4, wherein the encryption device is implemented via at least one of: (i) a field-programmable gate array, and (ii) an application specific integrated circuit.

6. The encryption device of 5, wherein the encryption device uses a single slice of a field-programmable gate array for each bit of information being encrypted or decrypted.

7. The encryption device of claim 6, wherein the encryption device comprises a look-up table.

8. The encryption device of claim 1, wherein the function bit is based on the right portion bit and a key bit.

9. The encryption device of claim 8, wherein the function bit is associated with an output of an encryption S-box.

10. The encryption device of claim 1, further comprising:
    a portion register coupled to the output line.

11. The encryption device of claim 1, wherein the encryption device is associated with at least one of: (i) an encryption core, (ii) generating a ciphertext output based on a plaintext input and an encryption key, (iii) generating a plaintext output based on a ciphertext input and a decryption key, (iv) a data encryption standard process, (v) a triple data encryption standard process, and (vi) an advanced encryption standard process.

12. A method of facilitating an encryption process, comprising:
    determining a swapped portion bit;
    determining a non-swapped portion bit; and
    providing, via a shared new data and swap input line, an output bit based, at least in part, on a shared new data and swap bit, to an output line adapted to provide the output bit to a left portion register, wherein the output bit represents the swapped portion bit, the non-swapped portion bit and the shared new data and swap bit,
    wherein the swapped portion bit is a right portion bit, and the non-swapped portion bit is a left portion bit combined with a function bit via an exclusive OR operation, and
    wherein the output bit is the shared new data and swap bit when a new left or right portion is being loaded by an encryption engine.

13. The method of claim 12, wherein the output bit is the shared new data and swap bit when the left portion bit, the right portion bit, and the function bit have pre-determined values.

14. A medium storing instructions adapted to be executed by a processor to perform a method of facilitating an encryption process, the method comprising:
    determining a swapped portion bit;
    determining a non-swapped portion bit; and
    providing via a shared new data and swap input line, an output bit based, at least in part, on a shared new data and swap bit, to an output line adapted to provide the output bit to a left portion register, wherein the output bit represents the swapped portion bit, the non-swapped portion bit, and the shared new data and swap bit, wherein the swapped portion bit is a right portion bit, and the non-swapped portion bit is a left portion bit combined with a function bit via an exclusive OR operation, and wherein the output bit is the shared new data and swap bit when a new left or right portion is being loaded by an encryption engine.

15. The medium of claim 14, wherein the output bit is the shared new data and swap bit when the left portion bit, the right portion bit, and the function bit have pre-determined values.

16. A system comprising:
a look-up table, comprising:
a left portion input line adapted to receive a left key signal;
a right portion input line adapted to receive a right key signal;
a shared new data and swap input line adapted to receive a shared new data and swap signal;
an S-box line adapted to receive a S-box signal associated with an encryption function;
an exclusive OR unit adapted to receive the left key and the S-box signal;
a multiplexer adapted to provide an output bit to a left portion register based, at least in part, on the shared new data and swap signal, wherein the output bit represents a swapped portion signal, a non-swapped portion signal, and the shared new data and swap signal, wherein the swapped portion signal is the right key signal, and the non-swapped portion signal is the left key signal combined with the S-box signal via an exclusive OR operation, and wherein the output bit is the shared new data and swap signal when a new left or right signal is being loaded by an encryption core.

17. The system of claim 16, wherein the look-up table is associated with a single slice of a field-programmable gate array.

* * * * *